(12) United States Patent
Huuhtanen et al.

(10) Patent No.: US 7,743,117 B2
(45) Date of Patent: Jun. 22, 2010

(54) SERVICE PROVISIONING METHOD, SYSTEM AND COMPUTER PROGRAM PRODUCT

(75) Inventors: Jarkko Huuhtanen, Helsinki (FI); Kimmo Vuori, Espoo (FI); Martin Vieth, Helsinki (FI)

(73) Assignee: Comptel Oyj, Helsinki (FI)

( * ) Notice: Subject to any disclaimer, the term of this patent is extended or adjusted under 35 U.S.C. 154(b) by 956 days.

(21) Appl. No.: 10/515,956

(22) PCT Filed: May 26, 2003

(86) PCT No.: PCT/FI03/00406

§ 371 (c)(1),
(2), (4) Date: Jul. 11, 2005

(87) PCT Pub. No.: WO03/102829

PCT Pub. Date: Dec. 11, 2003

(65) Prior Publication Data

US 2006/0166623 A1    Jul. 27, 2006

(30) Foreign Application Priority Data

May 30, 2002   (FI) .................................. 20021023

(51) Int. Cl.
*G06F 15/16* (2006.01)
(52) U.S. Cl. .................. 709/220; 709/223; 709/224
(58) Field of Classification Search ............. 709/220, 709/223, 224
See application file for complete search history.

(56) References Cited

U.S. PATENT DOCUMENTS

| | | | | |
|---|---|---|---|---|
| 2002/0068554 | A1* | 6/2002 | Dusse | 455/419 |
| 2002/0176378 | A1* | 11/2002 | Hamilton et al. | 370/328 |
| 2002/0199182 | A1* | 12/2002 | Whitehead | 725/1 |
| 2004/0198356 | A1* | 10/2004 | Dunlop et al. | 455/435.2 |

FOREIGN PATENT DOCUMENTS

| | | |
|---|---|---|
| CA | 2332479 A1 | 12/2001 |
| EP | 0 524 077 A1 | 1/1993 |
| WO | WO-93/00776 A1 | 1/1993 |
| WO | WO-99/62273 A1 * | 12/1999 |
| WO | WO-01/61468 A2 | 8/2001 |
| WO | WO-01/77831 A1 | 10/2001 |

\* cited by examiner

*Primary Examiner*—John Follansbee
*Assistant Examiner*—Nghi V Tran
(74) *Attorney, Agent, or Firm*—Birch, Stewart, Kolasch & Birch, LLP.

(57) ABSTRACT

The invention relates to a method, system and computer program product for provisioning in a communications network. The provisioning method includes at least a step for sending at least one request for defining measures relating to customers and/or services and/or network elements, the method including processing (20-23) each request, executing tasks according to the results of the processing step, and reporting the results to the requesting entity. In accordance with the invention, the processing steps are performed in functional layers (20-21) and the method steps of at least one layer (22) are performed by independently mountable and dismountable functional modules (30-34).

25 Claims, 5 Drawing Sheets

SERVICE PROVISIONING METHOD, SYSTEM AND COMPUTER PROGRAM PRODUCT

The invention is related to a method according to the preamble of claim 1, a system according to the preamble of claim 12 and a computer program product according to the preamble of claim 15.

In conventional techniques, a request processing functionality has been either tightly fixed into the system architecture or such functionality has been developed per customer (customer specific functionality).

If the request processing functionality is tightly fixed into the system architecture, it is very difficult to have discrete system functionality per operator type. Desired request processing functionality is in the product or not—nothing between.

If the request processing functionality is developed per customer, it is difficult to sell and manage this functionality in a productised way. The same type of functionality has to be implemented each time to a new customer and this means a lot of work and testing. It is challenging to further develop core system functionality since there can be any kind of request processing functionality developed to customers and it is not necessary possible to change system core without breaking customer specific functionality.

It is an object of the present invention to overcome the drawbacks of the above-described techniques and to provide an entirely novel type of method, system and computer program product.

The goal of the invention is achieved by implementing the system such that the provisioning system must receive service requests from a client system (e.g. customer care system, self care system), which triggers the request processing functionality defined in the service modules. System itself must take care of correct time and order of service request execution.

A service module is a request processing functionality of provisioning system, which implements some predefined functionality. A service module consists of two main parts; service module specific user interface, which provides a way to configure and manage service module, and functional part, which implements request processing functionality.

The system has basic rules, which define in which order service requests are processed through the installed service modules. It is not limited what kind of request processing functionality each service module may contain.

Another purpose of the invention is to be able to flexible provide different kind of service provisioning (subscriber creation and service activation) system functionality for telecommunication operators having different kind of provisioning system needs. For example operator having fixed network has different kind of needs for provisioning request management than operator having mobile network. In the service module concept, the system core and advanced provisioning request processing functionalities are separated, so each operator installation consists of system core and desired service modules, which together fulfils operators service provisioning requirements More specifically, the method according to the invention is characterized by what is stated in the characterizing part of claim 1, the system by what is stated in the characterizing part of claim 12, and the computer program product by what is stated in the characterizing part of claim 15.

In this document communication means all kind of tele-, data- or other communication in which computer or computers, computer program or computer programs or suchlike logic are used to manage provisioning operations.

In this document provisioning or service provisioning means for example creation, modification, activation and/or deactivation of subscribers, services, service providers, network elements, network devices, business support systems, customer care systems and/or billing systems with computer, computers, computer program, computer programs and/or suchlike logic systems in communication network in any combination mentioned above.

The invention offers significant benefits.

A request processing functionality for a service provisioning system can be developed independently from the system core. It is possibility to have different kind of customer installations with combination of system core and one or more service modules. If some customer needs some customer specific functionality, it can be developed in controlled way as a service module and new functionality can be offered also to other customers.

In the following, the invention will be examined in more detail by means of exemplifying embodiments with reference to the attached drawings, in which.

THE LOGICAL ENVIRONMENT OF THE INVENTION ACCORDING TO FIG. 1

Figure 1:
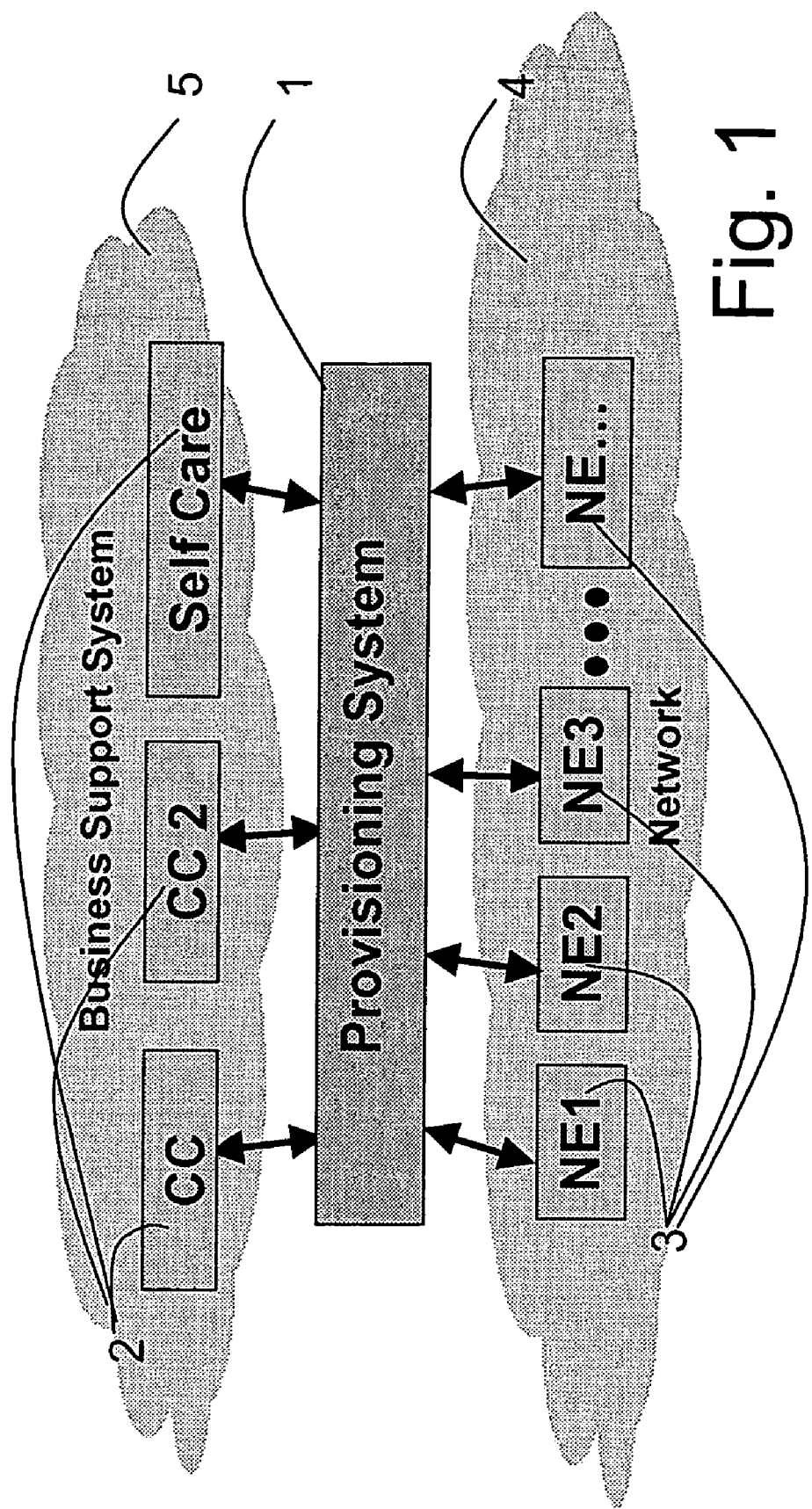
FIG. 1 shows a general block diagram of a system according to the invention.
Figure 2:
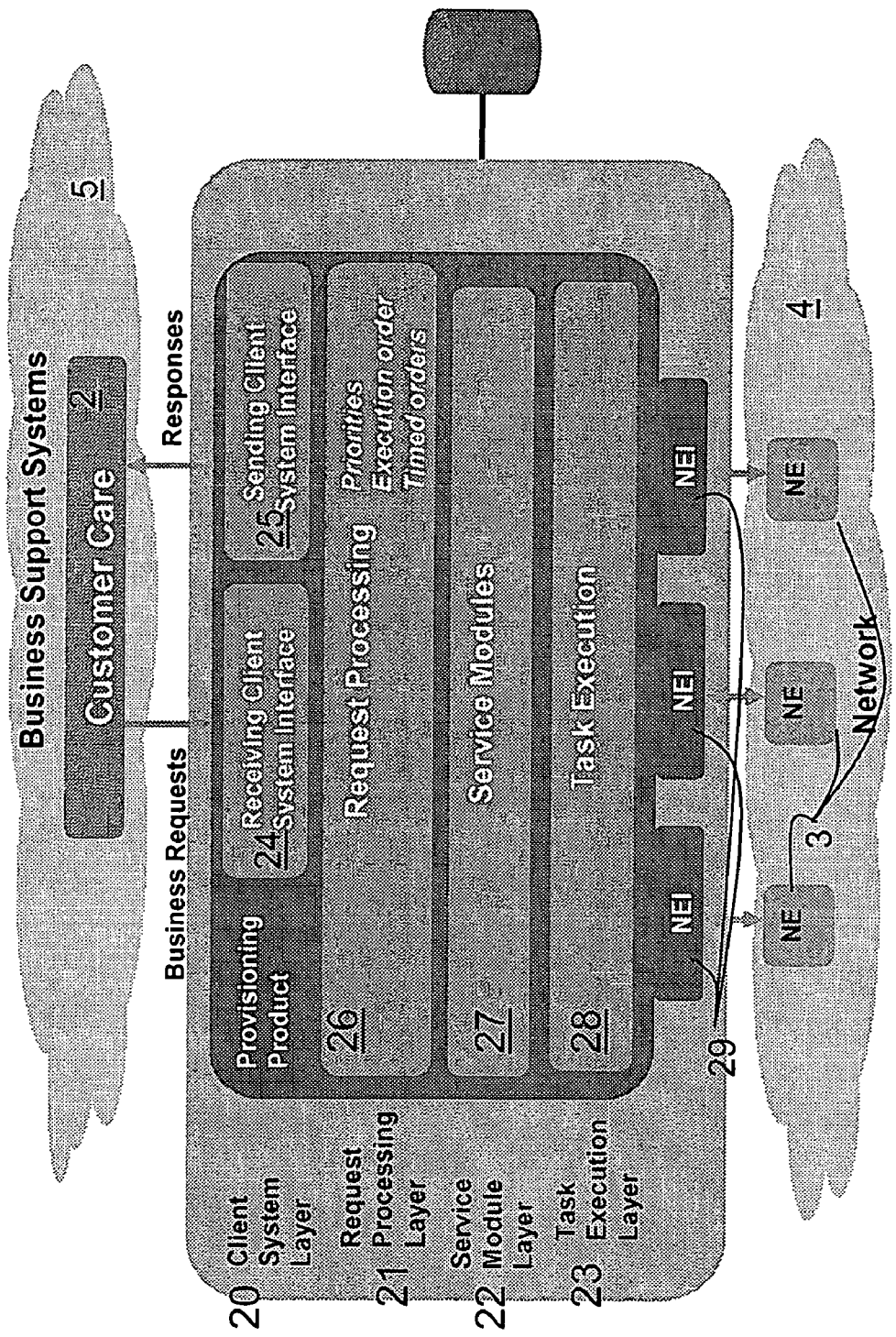
FIG. 2 shows a detailed block diagram of a system of FIG. 1 according to the invention.

The product, for which the invention is made, works as provisioning system 1, which can be used to create subscribers and activate services for them in a telecommunications network 4. There can be multiple client systems 2 in the business support system layer 5, for example, customer care systems and self care systems. These client systems 2 send service requests into provisioning system 1, which executes requests into one or multiple network elements 4. Typical network elements 4 are, for example in the mobile network, home location register (HLR), voice mail system (VMS) and short message service centre (SMSC). After provisioning system 1 has executed the service request, it sends a response back to the client system 5 containing the status of the service request.

There is a need to do request processing for the received requests in the provisioning system 1 before or during execution into network elements 3. The request processing can be, for example, routing of the service orders into the correct network element 3 (for example based on the number ranges), parameter manipulation, retrieval of information from a network element to be used in the service request execution or authorization of request sent by a client system 2. This request processing functionality differs from operator to operator depending on the type of the network and complexity of business support system 5. In a fixed (PSTN) network subscriber services are mostly located on a single network element, but in mobile networks a business service in a BSS layer can mean activation of subscriber data into multiple elements on the network level 5. If a BSS system does not contain view of the network (i.e. it only manages subscriber services on a business level), the provisioning system 1 must be able to convert business request into network level 5 operations. In this case provisioning system 1 has to offer an abstraction of the network level service to BSS system, so it has to only manage business level services to provisioning system.

PROVISIONING SYSTEM ARCHITECTURE ACCORDING TO FIG. 2

The provisioning system contains four layers; client system layer 20, request processing layer 21, service module layer 22 and task execution layer 23.

The client system layer 20 is responsible to receive service requests from the client systems 2, converts request into systems internal format and stores them into database. When the request has been executed and it has a final status, the client system 2 delivers a response to the client system.

The request processing 21 layer has the basic request processing functionality common to all provisioning product installations. It manages the correct execution order of the received service requests, handles the priorities so that service requests with higher priority may bypass requests with lower priority. If a service request is timed, the request processing layer takes care that the request will be executed in the correct time.

The service module layer 22 manages the service modules. Modules can be installed dynamically into the system and also removed dynamically. The core of the product has rules how requests are executed through installed service modules. Service Module Layer 22 receives requests from Request Processing Layer 21, sends network element specific operations (tasks) to Task Execution Layer 23, receives responses to tasks from it and sends the finalized request responses back to Request Processing Layer 21.

The task execution layer manages the connections to the network elements 3 and uses network element specific network element interfaces 29 (NEI) to execute tasks (network element specific service operations) into a network element 3. The network element interface 29 converts the order into a format network elements 3 understand it and provides a response to the executed task.

SERVICE MODULE LAYER ACCORDING TO FIG. 3

Service Module Layer 22 receives requests from Request Processing Layer 21, sends network element specific operations (tasks) to Task Execution Layer 23, receives responses to tasks from it and sends the finalized request responses back to Request Processing Layer 21.

Meaning of service modules 30-34 is to offer customizable functionality for the customer through service module GUI. This functionality may be used for creating complicated business logics, routing and authorization rules. Service modules 30-34 are plug-in components, which may be installed and taken into use separately. They interact with the product core through a service module interface.

Figure 3:
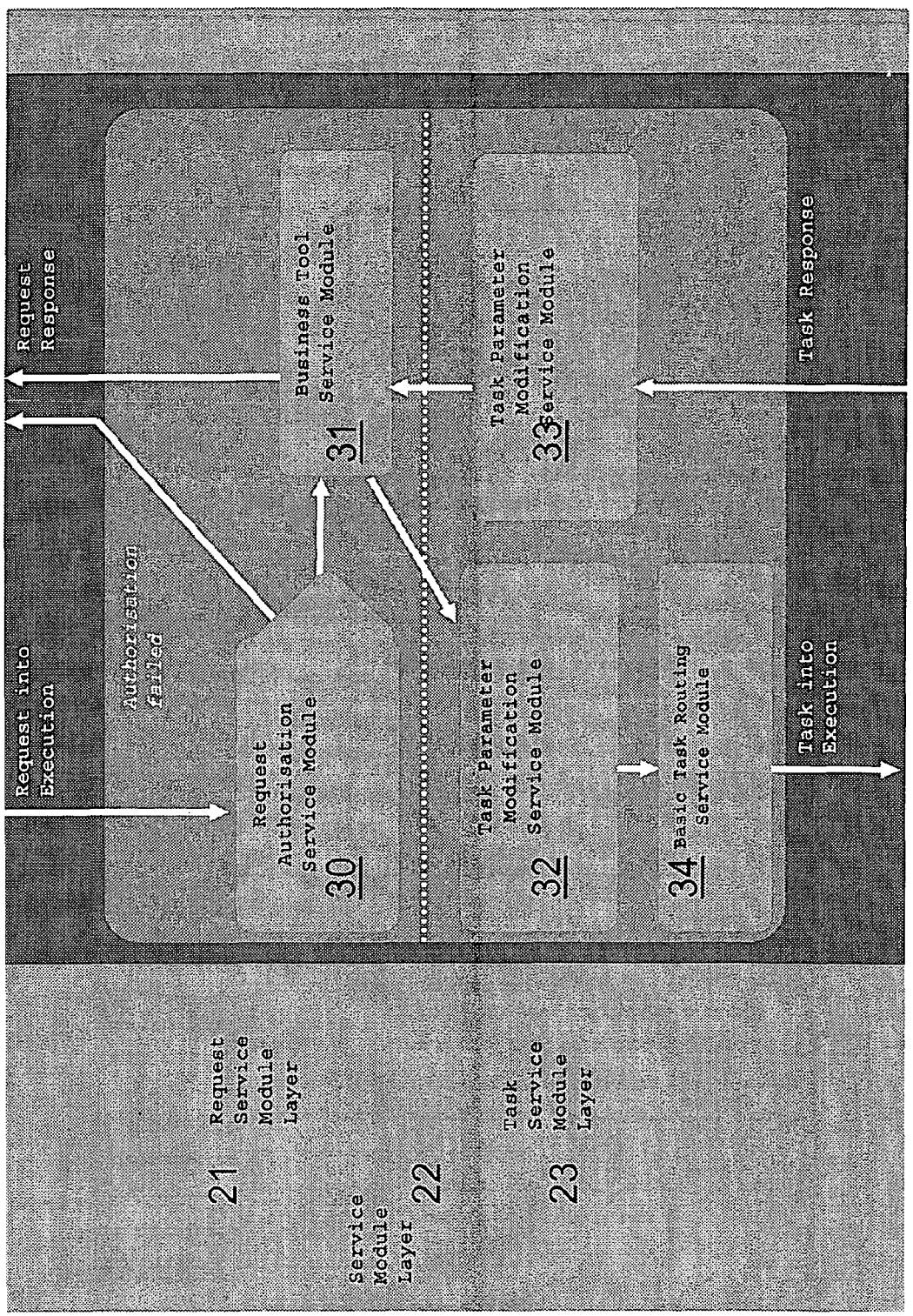
FIG. 3 shows a detailed block diagram of FIG. 2 according to the invention.

There are two types of service modules as indicated in the FIG. 3. The request service modules 30-31 contain functionality to manage requests and task service modules manage functionalities of network element specific tasks.

In the FIG. 3 there is an example of one possible configuration. On the request service module layer 21 there are two service modules; request authorization 30 and business tool service modules 31. The request authorization service module 30 has its own configuration, which defines the type of service requests each client system may send into execution. There is a relation defined into system that if request fails in the authorization service module 30, it is rejected and response created immediately. If the request is successfully authorized, it is passed to the business tool service module 31. The business tool service module 31 contains its own configuration, which defines how requests will be split into multiple network level tasks.

On the task service module layer 23 there are two different types of service modules; task parameter modification 32-33 and basic task routing service module 34. The task parameter modification service module can modify task parameter data. For example if a network element requires subscriber number without a country code, this validation and modification can be made in this module. It is also possible to execute task layer 23 service modules to the responses, so for example it is possible to do parameter modifications to responses from the network elements. The basic task routing can be used to define into which physical network element a task is routed. Network elements can be defined to serve, for example, a certain number range, which can be used as a routing criteria to which physical element task is executed.

The product core is able to process requests even if there are no service modules installed into the system. There is a default way defined for handling the incoming requests, sending tasks to Task Execution Layer, receiving task responses from it and sending the request responses back to the Request Processing Layer 21.

MAIN FUNCTIONALITY OF SERVICE MODULES

Service Module Layer 22 loads installed and active service modules 30-34 during system startup. The information about installed service modules is loaded from a database or file. Service modules 30-34 load their own configuration from the database or file at startup and when commanded by the system core.

When Service Module Layer 22 receives a request from Request Processing Layer 21, it gives the request to business logics 31, which may split the request into tasks, modify them and send task(s) back to Service Module Layer 21. It checks if there are Task Service Modules 32-34 installed and calls them in configurable order for modifying the task. After this the task is sent to Task Execution Layer 23.

Received task responses are returned by Task Execution Layer 23 to the Request Service Module 30, which has to know the actual state of the whole request. Request Service Module 30 may either return the request response to product core or continue processing the request using the business logics 31.

After completing the whole request, Request Service Module 30 returns the response to Service Module Layer 22, which then delivers the request response to Request Processing Layer 21.

Service modules 30-34 are independent of each other and can be installed separately. Each module has its own GUI (Graphical User Interface) and configuration. GUI is installed with the module. Module configuration is modified with service module GUI, Service Module Layer 22 does not know about the module configuration.

Each service module 30-34 has also its own reporting interface, which can be used to print service module specific reports. The system core can call for the service modules reporting interface, which defines how many and what kind of reports service module supports. The report can then be activated from the user interface of the product, which retrieves user specified report from a service module using the report interface.

REQUEST EXECUTION IN SERVICE MODULE LAYER 22

1) Service Module Layer 22 (SML) receives request (that may contain multiple tasks) from Request Processing Layer 21.
2) SML 22 sends request to Request Service Module 30.
3) Request Service Module 30 gives the request to the business logics 31.
4) Business logics process 31 request according to internal rules.
5) Business logic 31 sends task to SML 22.
6) SML 22 checks if there are any Task Service Modules 32-34 installed and processes the task using them.
7) SML 22 sends task to Task Engine Layer 23 and receives the response from it.
8) SML 22 sends the task response to Request Service Module 30.
9) If there are other tasks to be executed, Request Service Module 30 continues processing the request (steps 3-8)
10) When all tasks are executed and the request is completed, the Request Service Module 30 sends the request response to SML 22.
11) SML 22 sends response to Request Processing Layer 21.

Figure 4:
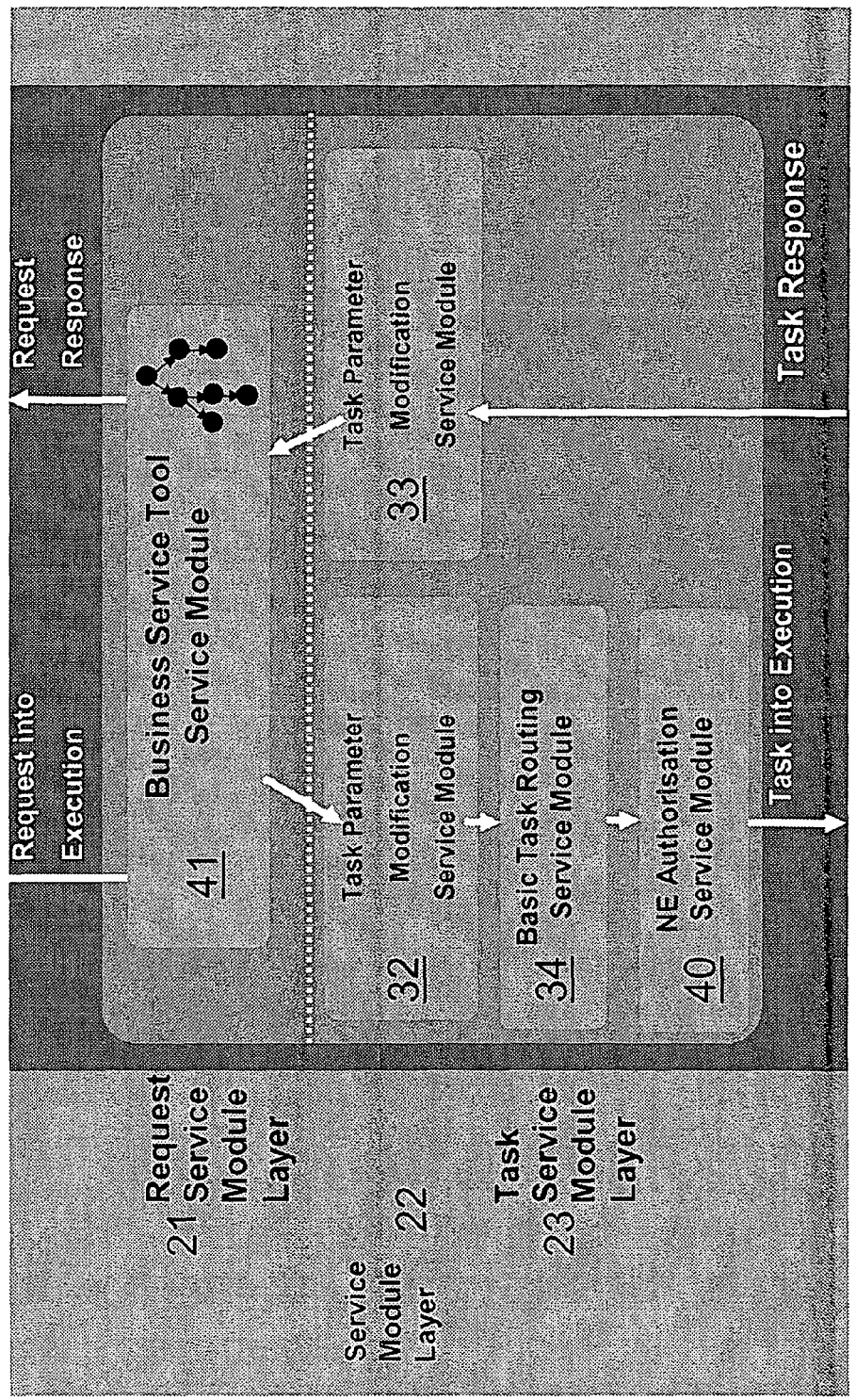
FIG. 4 shows a detailed block diagram of FIG. 2 according to an alternative embodiment of the invention.

In accordance with FIG. 4 the request service module layer 21 may comprise only one module, namely a business service tool service module 41 communicating with the task parameter modification service module 32 in the flow to the task execution and further, with the task parameter modification service module 33 during the task response flow.

Figure 5:
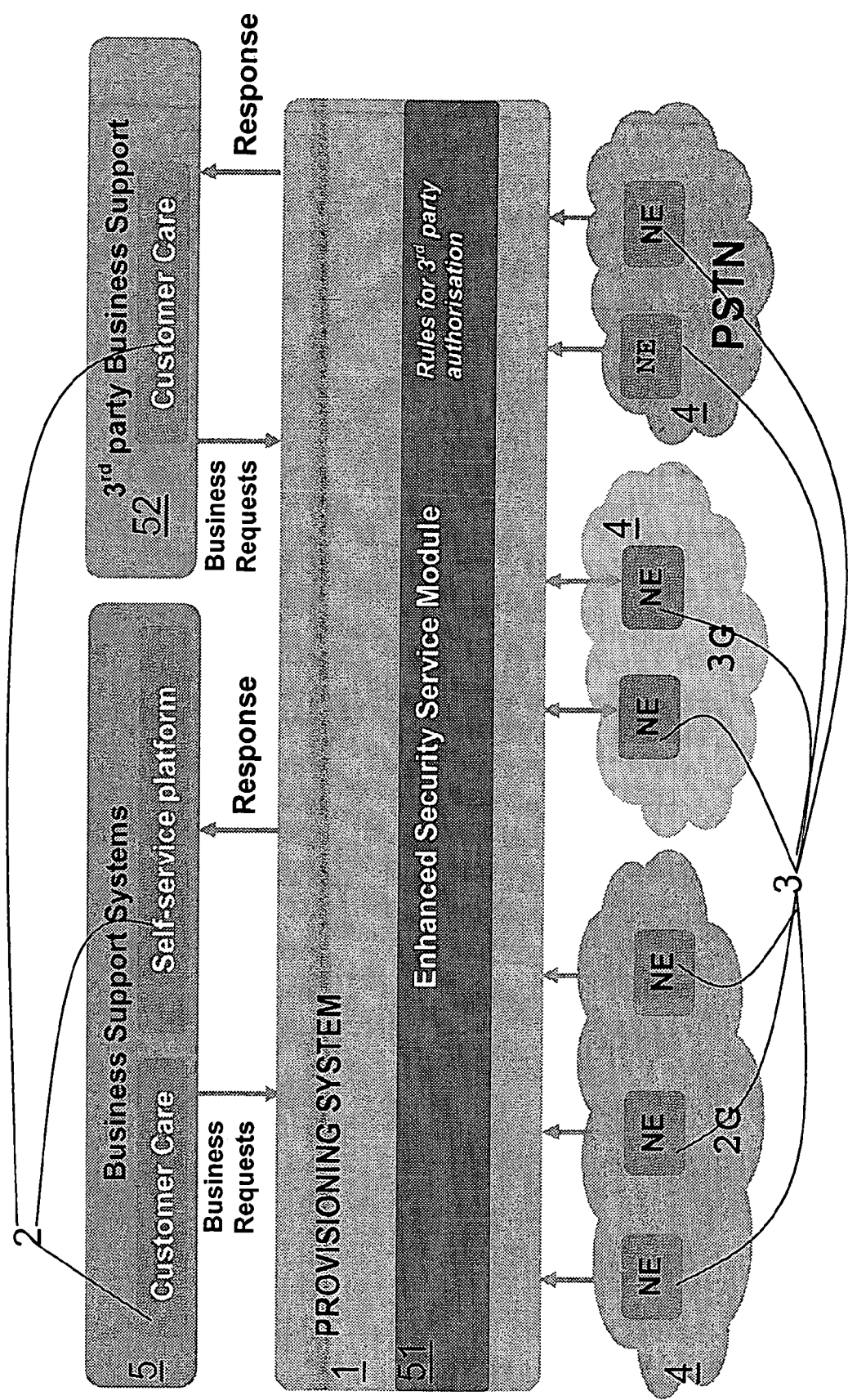
FIG. 5 shows as a block diagram an alternative embodiment of the invention.

FIG. 5 depicts a system in accordance with the present invention in which the provisioning system includes also an enhanced security service module 51 including rules an functionality for $3^{rd}$ party authorization. The enhanced security service module 51 communicates with $3^{rd}$ party business support systems 52.

Further, the Invention includes Following Features:

The rollback feature of the invention allows you to create rollback rules for each task in a business service request. With the rollback rules you can define that if one of the tasks in the request fails, no other tasks are sent for execution and a rollback operation is performed on the executed task. This is a very useful feature, for example, when creating a subscriber into several network elements. There are no inconsistencies in statuses of the tasks belonging to the same request and no need for manual intervention in the network elements.

In case of failing tasks also other operations (or no operations) can be defined instead of the rollback operation.

The invention provides you with flexible tools for parameter manipulation. It is capable of fetching parameters from external sources and inheriting them from executed tasks. The parameter manipulation of the invention includes also number conversion capability, which means that the solution in accordance with the invention is able to modify parameters, such as a telephone number, to a format expected by the target network element. The invention enables you also to manipulate responses, which it creates in response to each executed task. You can do this by creating rules in the system in accordance with the invention to define how the parameters of responses should be modified. The response manipulation rules enable, for example, language conversion. This means that it is possible to convert an error message from a network element that is in English, for example, into a Spanish one.

The invention allows you to define what kind of requests specified business support systems may create and in which network elements these requests can be executed. This is called a enhanced security feature. The capability is especially useful for operators who share their network with third-party service providers and can be used to provide more security into provisioning activity.

The routing feature of the invention has been developed to ensure that the tasks are directed to the correct network elements even when a request itself does not include a target network identifier. The invention is capable of fetching the appropriate identifier either from within the system itself or from external sources, such as a number portability server.

The invention allows you to assign execution times for requests. You can define when a specified request is to be executed in the provisioning system. The system in accordance with the invention activates the service at the predefined time instead of activating it instantly. You can also set priorities for the requests to define their execution order. Request priorisation is a useful feature especially in situations where the number of provisioning requests is high and real-time responses are needed for some of the requests. The performance and real-time requirements grow as self-provisioning solutions become more widely available.

The invention claimed is:

1. A method for provisioning a request for new services to specific network elements in a communications network using one or more processors, the method comprising:
   receiving a request from a customer care system through the one or more processors to provision new communication services;
   managing at least one service module operating in the functional layers of a communications system between a request processing layer and a task execution layer, through a service module interface that interacts with a product core;
   sending at least one request defining provisioning relating to at least one new customer and at least one new communication service through the one or more processors to specific network elements;
   processing each request to implement the provisioning relating to the at least one new customer and new service to configure the at least one service module with the service module interface;
   executing tasks according to the service module of the processing step;
   reporting the results to the requesting entity;
   performing the processing steps within the functional layers; and
   performing the method steps of at least one layer by independently mountable and dismountable functional modules.

2. A method according to claim 1, further comprising performing the functions of the service layer by functional modules.

3. A method according to claim 1 or 2, further comprising performing the processing steps in a client interface layer, a processing layer, a service module layer and a task execution layer.

4. A method according to claim 1, further comprising performing a rollback operation on the executed task if one of the tasks in the request fails, and no other tasks are sent for execution.

5. A method according to claim 1, further comprising determining if one of the tasks in the request fails, and the other tasks are sent for execution.

6. A method according to claim 1, further comprising determining if one of the tasks in the request fails, and the operation is ended.

7. A method according to claim 1, further comprising the processing steps include at least one step for parameter manipulation.

8. A method according to claim 1, further comprising the parameter manipulation step includes executable task parameter manipulation or response parameter manipulation.

9. A method according to claim 1, further comprising controlling the execution time of requests.

10. A method according to claim 1, further comprising controlling the execution priority of requests.

11. A method according to claim 1, directing network elements by a routing function in the absence of a target network identifier.

12. A system for provisioning a request for new services to specific network elements in a communications network through one or more processors, which system comprises:
- a processor generating a customer request to provision new services;
- at least one service module operating in the functional layers of a communications system between a request processing layer and a task execution layer, through a service module interface that interacts with a product core;
- at least one customer care unit sending requests for defining a service module relating to at least one new customer and at least one new service and through the one or more processors to specific network elements;
- at least one provisioning system receiving and process said request to implement the provisioning relating to the at least one new customer and new service to configure the at least one service module with the service module interface;
- at least one network element executing tasks according to the request processing in the provisioning system;
- the provisioning system is divided in functional layers, and
- at least one layer includes independently mountable and dismountable functional modules.

13. A system according to claim 12, further comprising the functions of the service layer are performed by functional modules.

14. A system according to claim 13, further comprising the processing steps are performed in client interface layer, processing layer, service layer and task execution layer.

15. A computer program product for provisioning a request for new services to specific network elements in a communications network through one or more processors comprising:
- a processor generating a request from a customer for provisioning;
- a computer program product having at least one service module operating in the functional layers of a communications system between a request processing layer and a task execution layer, through a service module interface that interacts with a product core;
- a computer program product that sends at least one request defining provisioning relating to at least one new customer and at least one new service and network element;
- a computer readable program code that processes each request to implement the provisioning relating to the at least one new customer and new service through the one or more processors to configure the at least one service module with the service module interface;
- a computer readable program code that executes tasks according to the service module of the processing step;
- a computer readable program code reporting the results to the requesting entity;
- the computer readable program code performing the processing steps in functional layers; and
- the computer readable program code performing the method steps of at least one layer by independently mountable and dismountable functional modules.

16. A computer program product according to claim 15, further comprising the functions of the service module layer are performed by functional modules.

17. A computer program product according to claim 15 further comprising the processing steps are performed in client interface layer, processing layer, service module layer and task execution layer.

18. A computer program product according to claim 15, further comprising if one of the tasks in the request fails, no other tasks are sent for execution and a rollback operation is performed on the executed task.

19. A computer program product according to claim 15, further comprising if one of the tasks in the request fails, the other tasks are sent for execution.

20. A computer program product according to claim 15, further comprising if one of the tasks in the request fails, and the operation is ended.

21. A computer program product according to computer program product claim 15, further comprising the processing steps include at least one step for parameter manipulation.

22. A computer program product according to computer program product claim 15, further comprising the parameter manipulation step includes executable task parameter manipulation or response parameter manipulation.

23. A computer program product according to computer program product claim 15, further comprising the execution time of requests is controlled.

24. A computer program product according to computer program product claim 15, further comprising the execution priority of requests is controlled.

25. A computer program product according to computer program product claim 15, further comprising in absence of a target network identifier the tasks are directed to correct network elements by a routing function.

* * * * *